United States Patent [19]

Glover et al.

[11] Patent Number: 5,595,353
[45] Date of Patent: Jan. 21, 1997

[54] FILM SPOOL FOR A FILMSTRIP

[75] Inventors: Edward C. T. S. Glover, London; Anthony Earle, Middlesex, both of England

[73] Assignee: Eastman Kodak Company, Rochester, N.Y.

[21] Appl. No.: 517,013

[22] Filed: Aug. 18, 1995

[30] Foreign Application Priority Data

Aug. 24, 1994 [GB] United Kingdom ............... 9417048

[51] Int. Cl.$^6$ ........................... G03B 23/02; B65H 19/28
[52] U.S. Cl. ........................ 242/348.1; 242/584.1
[58] Field of Search .................. 242/348.1, 348.4, 242/584.1, 332.8, 532.4; 354/275

[56] References Cited

U.S. PATENT DOCUMENTS

| | | | |
|---|---|---|---|
| 3,586,258 | 6/1971 | Horlezeder | 242/197 |
| 3,650,389 | 3/1972 | Mook | 242/74.1 X |
| 4,334,750 | 6/1982 | Fichter | 354/275 |
| 4,338,015 | 7/1982 | Holmes | 354/275 |
| 4,506,843 | 3/1985 | Luhrig et al. | 242/584.1 |
| 5,054,710 | 10/1991 | Ikariya et al. | 242/74 |
| 5,226,613 | 7/1993 | Katoaka et al. | 242/71.1 |
| 5,360,183 | 11/1994 | Takahashi et al. | 242/584.1 X |

FOREIGN PATENT DOCUMENTS

| | | |
|---|---|---|
| 2714164 | 10/1978 | Germany . |
| 1416450 | 12/1975 | United Kingdom . |
| 2199805 | 9/1991 | United Kingdom . |

*Primary Examiner*—John Q. Nguyen
*Attorney, Agent, or Firm*—Frank Pincelli

[57] ABSTRACT

Film cassettes normally include a spool on to which a filmstrip is wound. However, the filmstrip is normally fixed to the spool and needs to be severed therefrom prior to processing. Herein is a spool for a film cassette in which a filmstrip can easily be attached to and detached from the spool. The spool comprises a body portion carrying a pair of flange members and having a slot formed therein, the slot having a pair of shoulders and a protrusion. A pair of pin members are also provided in the body portion. A filmstrip is inserted into slot under shoulders and over protrusion until an aperture therein engages with the protrusion to retain the filmstrip. Inwardly applied pressure to the pin members pushes the filmstrip upwardly so that the aperture clears the protrusion to allow the filmstrip to be detached from the spool.

6 Claims, 2 Drawing Sheets

FILM SPOOL FOR A FILMSTRIP

FIELD OF THE INVENTION

The present invention relates to improvements in and relating to film cassettes and is more particularly concerned with means which allow repeated attachment/detachment of a filmstrip to/from a spool core retained in such cassettes.

BACKGROUND OF THE INVENTION

It is well known to rotatably support a filmstrip on a spool within a film cassette. In some such arrangements, the end of the filmstrip adjacent the spool is not secured thereto and there is a risk that the filmstrip will inadvertently become detached from the spool and hence be wholly withdrawn from the cassette during its exposure. One such arrangement is described in U.S. Pat. No. 4,145,133.

There are other arrangements which overcome this problem by attaching the trailing edge of the filmstrip to the spool. These arrangements prevent the filmstrip being fully extracted from the cassette during exposure, but necessitate the use of a cutter to detach the filmstrip from the spool prior to processing.

U.S. Pat. No. 5,054,710 discloses a spool for a camera on to which a filmstrip is to be wound during exposure. The spool includes a shaft having a slit formed therein. A protrusion is located in the slit to engage a perforation in the leading edge of the filmstrip, the filmstrip being wound on to the spool as it is exposed in the camera. When the filmstrip is fully exposed, it is unwound from this spool back into its cassette. The leading edge of the filmstrip slips out of the slit as the wall of the perforation engaging the protrusion slides down an angled wall thereof to release the filmstrip from the spool.

U.S. Pat. No. 4,334,750 discloses an arrangement for a spool in a film cassette which allows the trailing edge of the filmstrip to be released. The arrangement comprises a hollow spool having a slot formed in its wall. A retaining member is located within the hollow spool and carries a protrusion for engaging a perforation in the trailing edge of the filmstrip to retain it in the slot. When it is desired to release the filmstrip from the spool, the retaining member is pushed inwardly with respect to the spool so that the protrusion is forced out of the slot thereby releasing the perforation and the trailing edge. Once pushed in, the retaining member cannot be withdrawn from the spool.

PROBLEM TO BE SOLVED BY THE INVENTION

Although the arrangement described in U.S. Pat. No. 4,334,750 provides a means of releasably attaching a filmstrip to a spool in a film cassette, once the retaining member is pushed in to release the filmstrip, the spool is not re-usable.

SUMMARY OF THE INVENTION

It is an object of the present invention to provide a new spool to which the trailing edge of a filmstrip can be releasably attached.

It is a further object of the present invention to provide an improved film cassette which incorporates such a spool.

A further object of the present invention is to provide a spool for a film cassette which is reusable.

In accordance with one aspect of the present invention, there is provided a spool for a filmstrip, the spool comprising:

a body portion;

a slot formed in the body portion; and a protrusion provided in the slot for engagement with an aperture formed in the filmstrip for attaching the filmstrip to the spool;

characterized in that the spool further includes actuating means operable to push the filmstrip so that the aperture formed therein is moved out of engagement with the protrusion to detach the filmstrip from the spool.

Advantageously, the actuating means comprises a pair of pin members which are arranged one each end of the body portion of the spool, each pin member being movable into slot to engage edges of the filmstrip.

The pin members are located in respective holes formed in the body portion, each hole being aligned with at least a portion of the slot.

In accordance with another aspect of the present invention, there is provided a film cassette incorporating a spool as described above.

In accordance with a further aspect of the present invention, there is provided a method of releasably attaching a filmstrip to a film cassette spool as described above, the method comprises the steps of:

a) inserting the filmstrip into the slot formed in the body portion of the cassette spool;

b) engaging aperture of the filmstrip with the protrusion in the slot; and c) detaching the filmstrip from the protrusion, characterized in that step c) comprises pushing on the side edges of the filmstrip using the actuating means to disengage aperture from the protrusion thereby releasing the filmstrip from the spool.

ADVANTAGEOUS EFFECT OF THE INVENTION

A simple arrangement is provided by which a filmstrip can be easily attached to and detached from a spool in a film cassette, thereby allowing the film cassette and spool to be re-used.

Advantageously, there is no requirement to alter the film finishing or punching operations in order to utilize the spool of the present invention.

BRIEF DESCRIPTION OF THE DRAWINGS

For a better understanding of the present invention, reference will now be made, by way of example only, to the accompanying drawings in which.

DETAILED DESCRIPTION OF THE INVENTION

The present invention relates to an improved film spool on which the trailing edge of a filmstrip can be releasably mounted.

Figure 1:
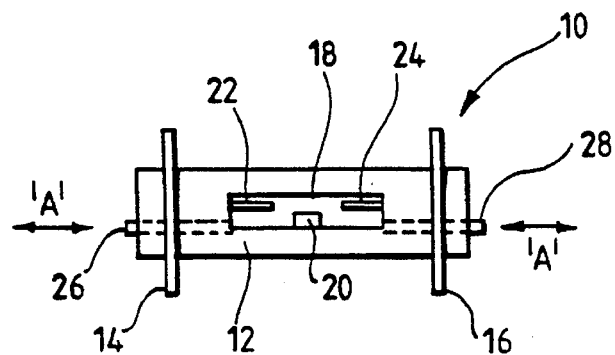
FIG. 1 a schematic side elevation of a spool for a film cassette in accordance with the present invention.

In FIG. 1, a film spool 10 is shown. The spool 10 comprises a body portion 12 which carries two flange members 14, 16 spaced apart along the body portion a distance to accommodate the width of the filmstrip to be wound thereon. A slot 18 is formed in the body portion 12 for retaining the trailing end of the filmstrip (not shown). The slot 18 has a central protrusion 20 and two shoulder portions 22, 24 formed one on either side of the protrusion 20. A pair of pin members 26, 28 are provided at either end of the body portion 12 as shown, the pin members 26, 28 being movable into and out of the spool in the direction indicated by arrows 'A'.

Figure 2:
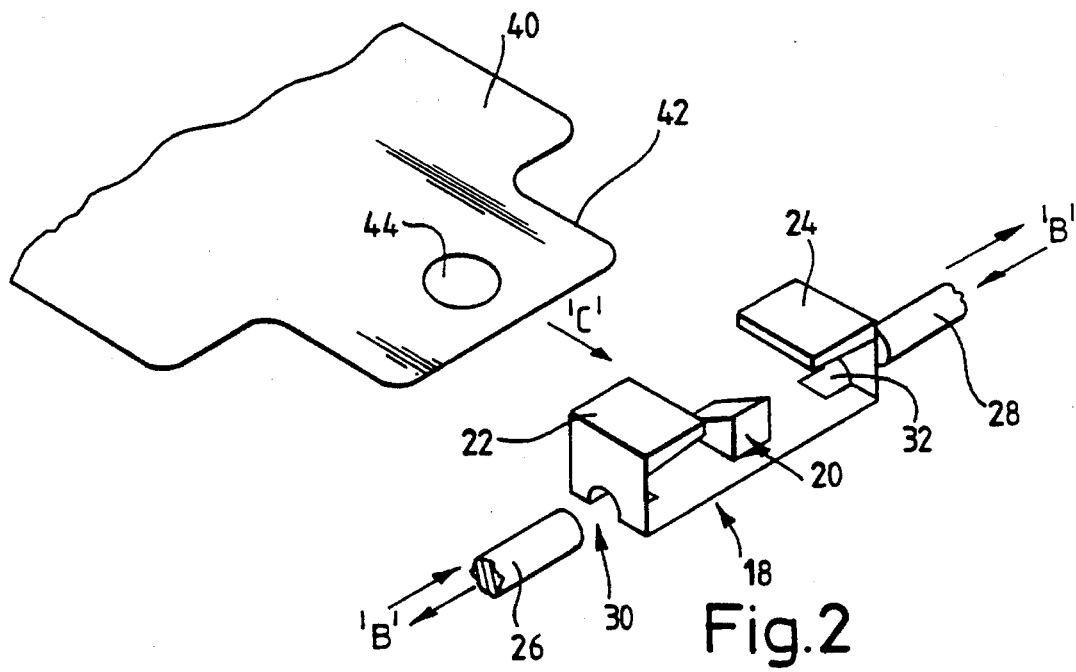
FIG. 2 is schematic perspective view illustrating the attachment portion of the film spool shown in FIG. 1.

FIG. 2 illustrates schematically the slot 18 together with the protrusion 20 and shoulder portions 22, 24 of the body portion 12 and the two pin members 26, 28. Two holes 30, 32 are shown which are shaped and sized to receive the pin members 26, 28 as they move into and out of the body portion 12 of the spool 10 as indicated by arrows 'B'. The cooperation between the pin members 26, 28 and their associated holes 30, 32 will be described in more detail later.

A portion of a filmstrip 40 is shown having a trailing end 42 with a single central aperture 44 formed therein. For attachment to the spool 10, the trailing end 42 of the filmstrip 40 is passed into slot 18 under shoulder portions 22, 24, in the direction indicated by arrow 'C' so that aperture 44 engages protrusion 20. Protrusion 20 is ramped to allow the trailing end 42 to pass over it until the aperture 44 is reached, the aperture 44 engaging with the protrusion 20 to retain the trailing end 42 of the filmstrip 40 in the slot 18 of the spool 10. Engagement of the aperture 44 with the protrusion 20 is shown more clearly in FIG. 3.

Figure 3:
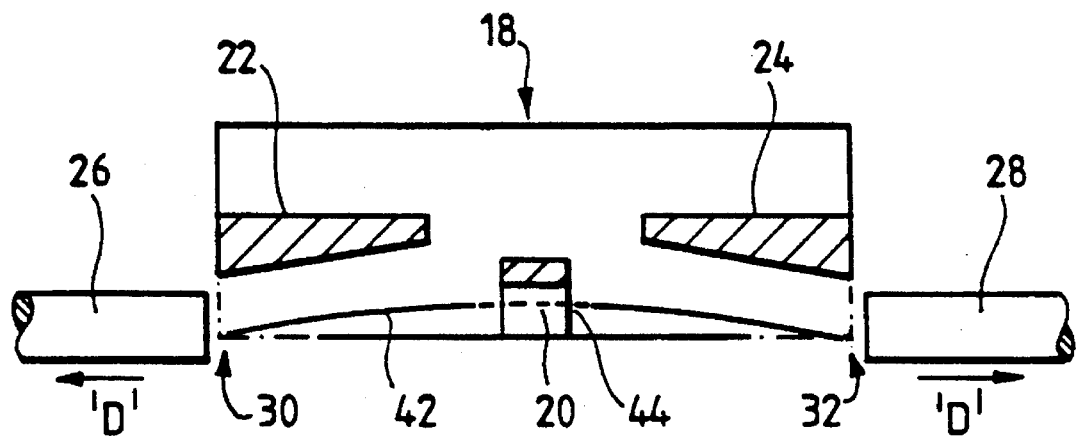
FIG. 3 shows an enlarged sectioned view of the slot of the film spool shown in FIG. 1 with the filmstrip in its retained position.

FIG. 3 shows the slot 18 with the trailing end 42 of the filmstrip engaged therewith. Here, pin members 26, 28 have been pushed out of their respect holes 30, 32, indicated by arrows 'D', by the trailing end 42 of the filmstrip. Aperture 44 is engaged with protrusion 20.

Figure 4:
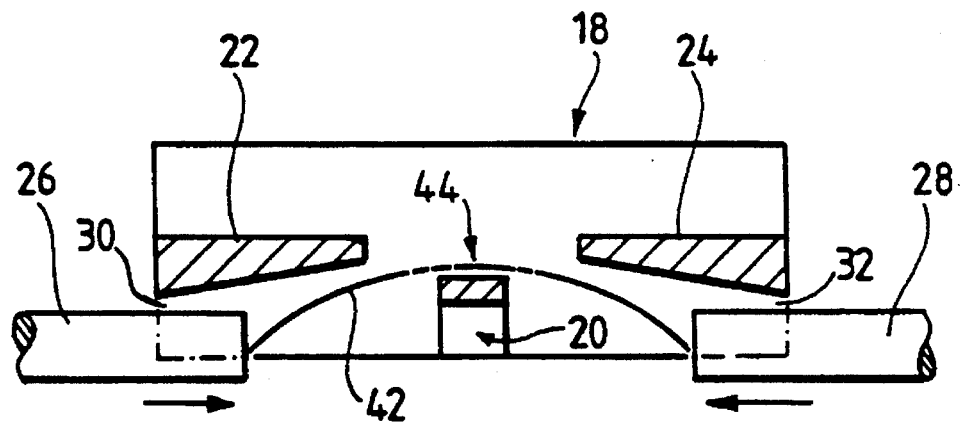
FIG. 4 is similar to FIG. 3 but with the filmstrip in its released position.

When it is desired to detach the trailing end 42 from the spool 10, pin members 26, 28 are pushed into their respective holes 30, 32. As this is done, the trailing end 42 is pushed upwards so that the aperture 44 clears the protrusion 20. This is shown in FIG. 4. The filmstrip can then be pulled away from the slot 18 in the spool 10.

Removal of the trailing end 42 from the slot 18 is made easier if the width of the trailing end 42 is slightly wider than the slot 18 so that it is always slightly bowed as shown in FIG. 3. This makes it easier for the portion of the trailing end 42 having the aperture 44 formed therein to be pushed upwards to clear the protrusion 20 and allow the filmstrip 40 to be detached from the spool 10.

PARTS LIST

10 . . . film spool
12 . . . body portion
14, 16 . . . flange members
18 . . . slot
20 . . . central protrusion
22, 24 . . . shoulder portions
26, 28 . . . pin members
30, 32 . . . holes
40 . . . filmstrip
42 . . . trailing end
44 . . . aperture

We claim:

1. A spool for a filmstrip, the spool comprising:

a body portion having a first end and a second end;

a slot formed in the body portion intermediate the first end and the second end thereof; and a protrusion provided in the slot for engagement with an aperture formed in the filmstrip for attaching the filmstrip to the spool, the filmstrip having a pair of side edges;

characterized in that the spool further includes actuating means positioned adjacent the protrusion and operable to push opposite side edges of the filmstrip in directions toward each other so that the aperture is moved out of engagement with the protrusion detach the filmstrip from the spool.

2. A spool according to claim 1, wherein the actuating means comprises a pair of pin members, one pin being arranged at the first end and the other pin at the second end of the body portion of the spool, each pin member being movable into the slot to engage the side edges of the filmstrip.

3. A spool according to claim 2, wherein the body portion includes a first hole formed in the first end and a second hole formed in the second end thereof, each pin member being located in a respective one of the first and second holes, each hole being aligned with at least a portion of the slot so as to allow engagement of the edges of the filmstrip.

4. A spool according to claim 1, further including a pair of flange members, each flange member being attached to a respective one of the first and second end of the body portion, the flange members restraining a filmstrip wound on the spool.

5. A film cassette including a filmstrip wound onto a spool, the spool comprising:

a body portion having a first end and a second end;

a slot formed in the body portion intermediate the first end and the second end thereof; and a protrusion provided in the slot for engagement with an aperture formed in the filmstrip for attaching the filmstrip to the spool, the filmstrip having a pair of side edges;

characterized in that the spool further includes actuating means positioned adjacent the protrusion and operable to push the opposite side edges of the filmstrip in directions toward each other so that the aperture formed in the filmstrip is moved out of engagement with the protrusion thereby detaching the filmstrip from the spool.

6. A method of releasably attaching and detaching a filmstrip to a film cassette spool, said spool comprising:

a body portion having a first end and a second end;

a slot formed in the body portion intermediate the first end and the second end thereof; and a protrusion provided in the slot for engagement with an aperture formed in the filmstrip for attaching the filmstrip to the spool, the filmstrip having a pair of side edges;

characterized in that the spool further includes actuating means positioned adjacent the protrusion and operable to push opposite side edges of the filmstrip in directions toward each other so that the aperture formed in the filmstrip is moved out of engagement with the protrusion thereby detaching the filmstrip from the spool, the method comprising the steps of:

a) inserting the filmstrip into the slot formed in the body portion of the cassette spool;

b) engaging the aperture of the filmstrip with the protrusion in the slot; and c) detaching the filmstrip from the protrusion, characterized in that step c) comprises pushing on the side edges of the filmstrip using the actuating means to disengage aperture from the protrusion to release the filmstrip from the spool.

\* \* \* \* \*